(12) United States Patent
Huang et al.

(10) Patent No.: US 12,514,788 B2
(45) Date of Patent: Jan. 6, 2026

(54) PERMEABLE SPRAYING DEVICE FOR MAKING DRUG TABLETS

(71) Applicant: Taiwan Mercury Medical Corporation, New Taipei (TW)

(72) Inventors: Kuo-Ming Huang, New Taipei (TW); Yen-Shu Lin, New Taipei (TW); Yen-Chao Yang, New Taipei (TW); Yao-Jen Liang, New Taipei (TW)

(73) Assignee: Taiwan Mercury Medical Corporation, New Taipei (TW)

( * ) Notice: Subject to any disclaimer, the term of this patent is extended or adjusted under 35 U.S.C. 154(b) by 334 days.

(21) Appl. No.: 18/140,197

(22) Filed: Apr. 27, 2023

(65) Prior Publication Data
US 2023/0255852 A1    Aug. 17, 2023

Related U.S. Application Data

(63) Continuation-in-part of application No. 17/122,770, filed on Dec. 15, 2020, now abandoned.

(51) Int. Cl.
*A61J 3/06* (2006.01)
*B29C 64/165* (2017.01)
(Continued)

(52) U.S. Cl.
CPC ............... *A61J 3/06* (2013.01); *B29C 64/165* (2017.08); *B29C 64/245* (2017.08); *B29C 64/35* (2017.08);
(Continued)

(58) Field of Classification Search
CPC ... B29C 64/379; B29C 64/245; B29C 64/165; B29C 64/35
See application file for complete search history.

(56) References Cited

U.S. PATENT DOCUMENTS

2021/0186817 A1 * 6/2021 Huang ................... B33Y 10/00
2022/0134668 A1 * 5/2022 Andrews ................ B33Y 30/00

FOREIGN PATENT DOCUMENTS

DE        102017001622 A1 *  8/2018
WO    WO-2022108228 A1 *  5/2022 ............ B08B 1/005
WO    WO-2022186704 A1 *  9/2022

OTHER PUBLICATIONS

Translation of DE-102017001622-A1 (Year: 2018).*
Translation of WO-2022108228-A1 (Year: 2022).*

* cited by examiner

*Primary Examiner* — John J DeRusso
(74) *Attorney, Agent, or Firm* — Che-Yang Chen; Law Office of Michael Chen

(57) ABSTRACT

A permeable spraying device for making drug tablets mainly comprises a carrying platform, a spraying equipment, a flattening device and a control equipment, the carrying platform defines a powder dropping area and a flattened spraying area, and a moving device combined with the carrying platform is capable of moving vertically. The spraying equipment is mounted above the carrying platform, and the spraying equipment comprises a powder box, a colloid spraying equipment, a driving device and a placement platform. The placement platform is disposed with a plurality of supplementary colloid carriers. The flattening device is installed on the carrying platform and moves horizontally back and forth in the flattened spraying area. The control equipment is equipped with a storage unit and an execution control unit. A multi-layer drug body structure can be formed by deposition, stacking and bonding.

10 Claims, 9 Drawing Sheets

(51) Int. Cl.
*B29C 64/245* (2017.01)
*B29C 64/35* (2017.01)
*B29C 64/379* (2017.01)
*B33Y 10/00* (2015.01)
*B33Y 30/00* (2015.01)
*B33Y 40/00* (2020.01)
*B33Y 80/00* (2015.01)

(52) U.S. Cl.
CPC ............ *B29C 64/379* (2017.08); *B33Y 10/00* (2014.12); *B33Y 30/00* (2014.12); *B33Y 40/00* (2014.12); *B33Y 80/00* (2014.12)

US 12,514,788 B2

PERMEABLE SPRAYING DEVICE FOR MAKING DRUG TABLETS

BACKGROUND OF THE INVENTION

Field of Invention

The invention is a device for making drug tablets, and more particularly a permeable spraying device for making drug tablets.

Related Art

Drug tablet on the market is one of the most common types in drug bags, the current manufacturing method for drug tablets is performed by sliding the mixed powder into a tablet machine from an upper funnel, the mixed powder enters a powder tank and falls into sets of tablet molds, a size of the space in the mold determines a volume of the tablet. After entering the mold, the powder will first have a preliminary appearance according to a shape of the mold, the structure is loose, and a thickness is about 2-3 times of that of the final product. Then, upper and lower molds squeeze each other to compress the originally loose powder into a sturdy tablet that can withstand collisions. Finally, the lower mold pushes the tablet upward to get the tablet out of the mold. By designing the shape of the mold to determine the appearance and size of the drug tablet, and then through the manufacturing process of machine filling, extrusion, and demolding rotation, tens of thousands of the same tablet can be manufactured in a short time. This traditional drug manufacturing method requires not only mixing the compositions and proportions of the drug, but also requires manufacturing with molds. Therefore, one type of tablet requires one type of molding press. Due to the problem of wear and tear of molding press, multiple sets of the same type of molding press must be prepared, and thus leads to high overall costs. When production volumes of special tablets are not high, unit prices of the tablets cannot be reduced. Not only that, when tablets are made with traditional drug manufacturing method, different shapes of tablets require different molds, this further leads to high costs.

The detailed features and advantages of the invention are described in detail in the following embodiments, the contents thereof are sufficient to enable those with ordinary skill in the art understand the technical contents of the invention and implement accordingly, and according to the contents, claims and drawings disclosed in this specification, those having ordinary skill in the art can easily understand the related objects and advantages of the invention.

SUMMARY OF THE INVENTION

A main object of the invention is to use a permeable spraying method of the invention to spray at designated positions according to compositions of drug tablets, and a multi-layer drug body structure can be formed by deposition, stacking and bonding, which is not only faster in manufacturing, but also lower in cost.

A secondary object of the invention is to form a multi-layer drug body structure by having spraying of each layer of colloid by deposition, stacking and bonding, which is capable of effectively controlling dissolution time of different medicinal properties, thereby suitable hierarchical positions can be configured according to the priority of different medicinal properties to achieve optimum release timings for different drug properties.

Another object of the invention is to use a drug tablet manufacturing device of the invention to make drug tablets of different shapes at will without the need to make molds additionally, so that the costs for manufacturing drug tablets can be effectively controlled.

In order to achieve the above objects, the invention provides a permeable spraying device for making drug tablets comprising a carrying platform defining a powder dropping area and a flattened spraying area adjacent to the powder dropping area, the carrying platform combines with a moving device capable of moving vertically; a spraying equipment mounted above the carrying platform, the spraying equipment comprises at least one powder box for storing a powder, at least one colloid spraying equipment, a driving device connected to the colloid spraying equipment and for horizontal movement and a placement platform, wherein the powder box is correspondingly disposed above the powder dropping area, the colloid spraying equipment is correspondingly disposed above the flattened spraying area and comprises a plurality of colloid carriers for accommodating a medicinal colloid and a plurality of sprinklers respectively connected with each of the colloid carriers for spraying the colloid, wherein each of the sprinklers further comprises a plurality of colloid inlets connected with each of the colloid carriers and a plurality of nozzles communicated with the colloid inlets and spraying the colloid, and the placement platform is provided with a plurality of supplementary colloid carriers, each of the supplementary colloid carriers is provided with a pressure controller connected to the colloid carrier to automatically replenish the colloid; a flattening device installed on the carrying platform and capable of moving horizontally back and forth in the flattened spraying area; a control equipment equipped with a storage unit for storing a tablet spraying information and an execution control unit connected to the storage unit and controlling the powder box, the flattening device and the colloid spraying equipment to execute the tablet spraying information; and a clamping equipment, disposed on one side of the carrying platform and facing the flattened spraying area.

According to one embodiment of the invention, wherein the powder box further comprises a stirring member installed therein and a driving member connected to the stirring member.

According to one embodiment of the invention, wherein the powder has medicinal compositions.

According to one embodiment of the invention, wherein the tablet spraying information comprises powder compositions, powder layer quantity, colloid compositions, colloid layer quantity, and colloid structure.

According to one embodiment of the invention, further comprising a carrier for making drug tablets and for the clamping equipment to clamp and move, and the carrier is placed on the flattened spraying area.

According to one embodiment of the invention, wherein the carrier is a tray.

According to one embodiment of the invention, wherein the clamping equipment can be either a hoist or a mechanical arm.

According to one embodiment of the invention, further comprising a nozzle cleaning equipment disposed on one side of the carrying platform and capable of cleaning each of the nozzles.

According to one embodiment of the invention, wherein the nozzle cleaning equipment comprises a soaking area for liquid immersion of the nozzles, a strong jetting area located on one side of the soaking area and capable of jetting gas strongly to the nozzles, and a scraper equipment located on one side of the strong jetting area and capable of completely scraping liquid on the nozzles.

According to one embodiment of the invention, wherein the scraper equipment is soft rubber.

According to one embodiment of the invention, wherein the strong jetting area defines an inclined plane inclined from the scraper equipment towards the soaking area.

According to one embodiment of the invention, further comprising an ultrasonic equipment disposed on one side of the carrying platform.

DETAILED DESCRIPTION OF THE INVENTION

Figure 1:
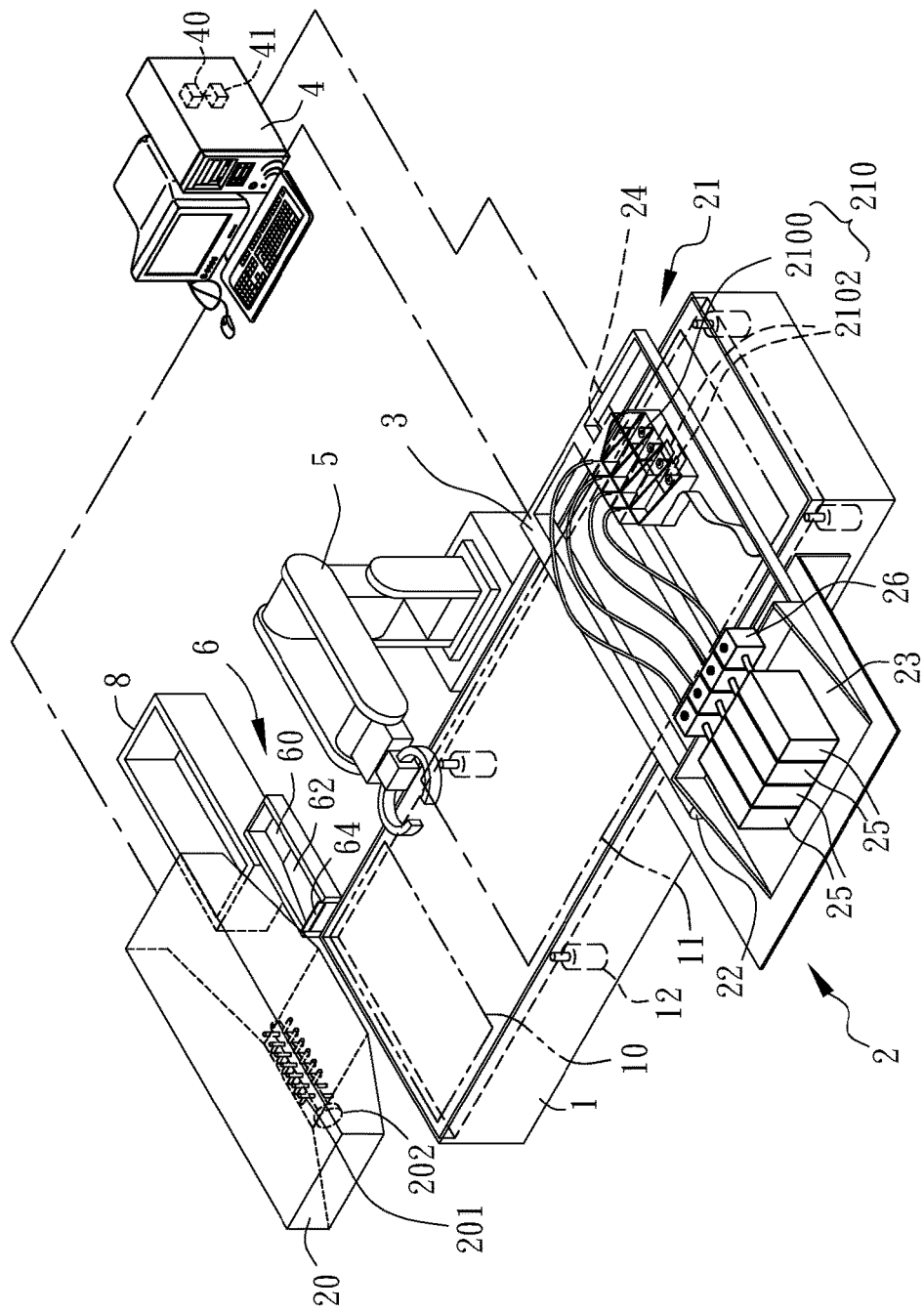
FIG. 1 is a perspective view of a preferred embodiment of the invention.

The following specific embodiments illustrate the implementation of the invention. Those having ordinary skill in the art can easily understand the other advantages and efficacies of the invention from the content disclosed in this specification.

The structures, proportions, sizes shown in the drawings in conjunction with this specification are merely used to match the content disclosed in the specification for the understanding and reading of those having ordinary skill in the art, and are not intended to limit the conditions under which the invention can be implemented, so they have no technical substantial significance. Any structural modifications, changes in proportional relationships, or size adjustments should still fall within the scope of the technical content disclosed in the invention without affecting the efficacies and objects that can be achieved by the invention. At the same time, terms such as "one", "two", "above", "upper" etc., cited in this specification are merely for understanding of the description, and are not intended to limit the scope of implementation of the invention, and changes or adjustments in their relative relationships should also be regarded as the scope that can be implemented by the invention without substantial changes made to the technical content.

Figure 4:
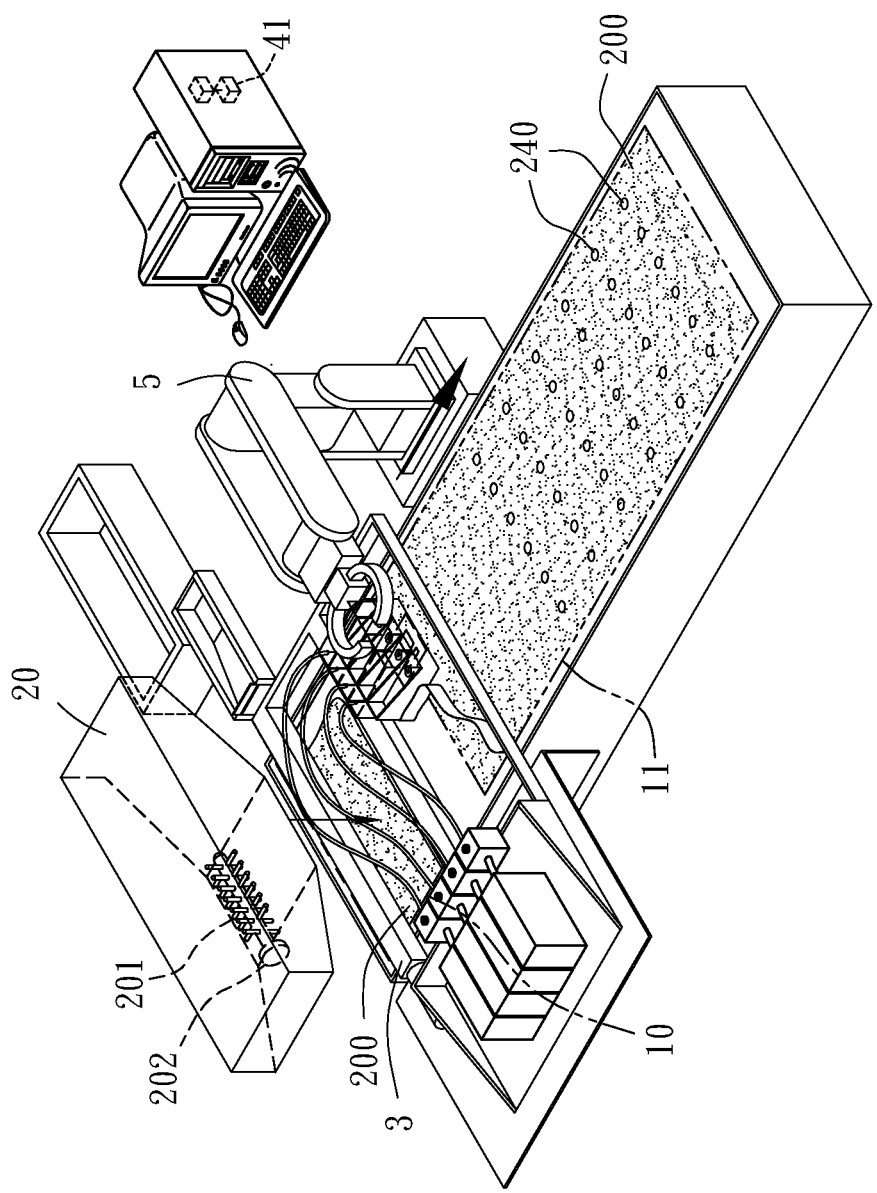
FIG. 4 is a schematic diagram of a usage state of the powder box of the invention when powder is dropped and spread again.
Figure 5:
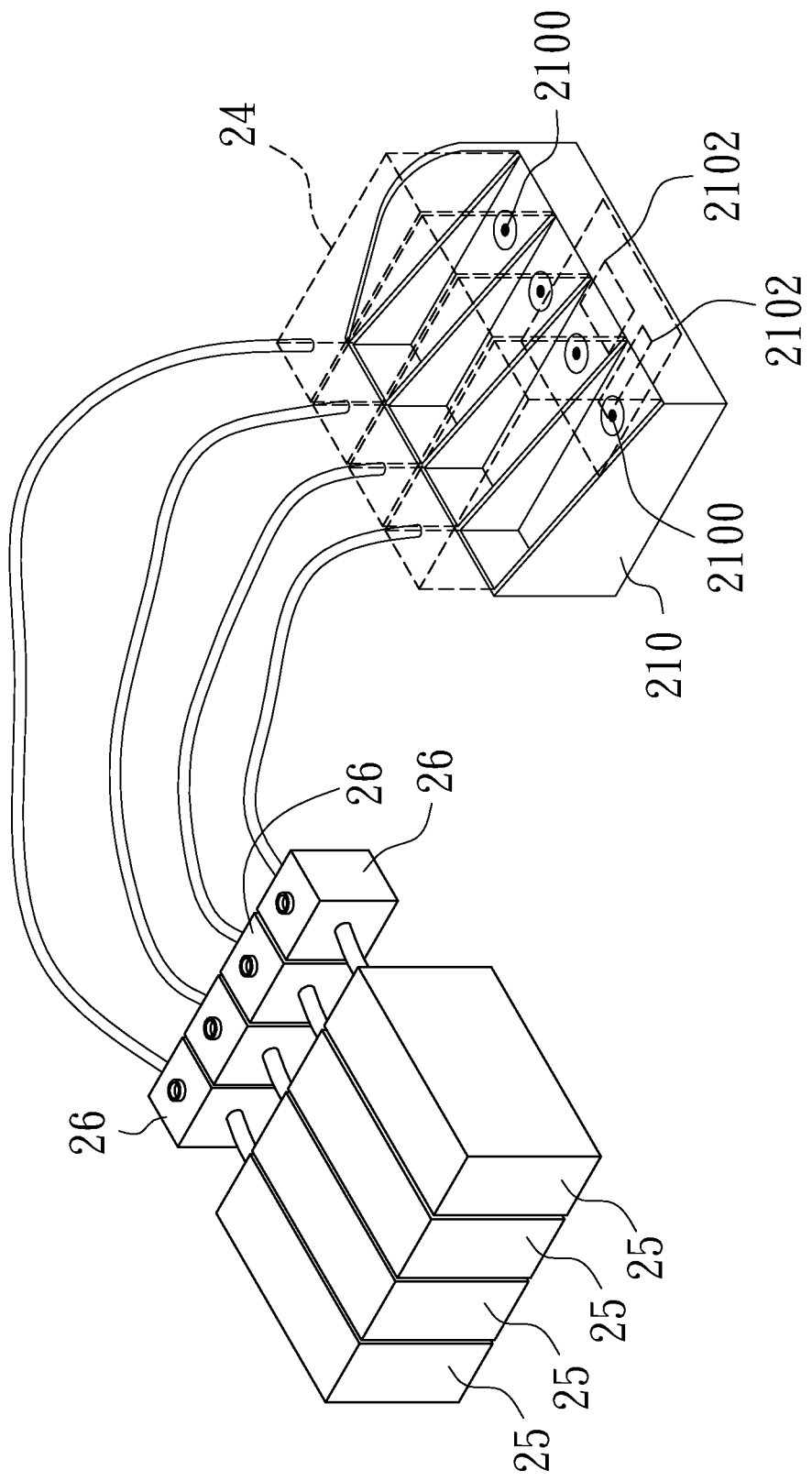
FIG. 5 is a perspective view of the colloid spraying equipment of the invention.
Figure 7:
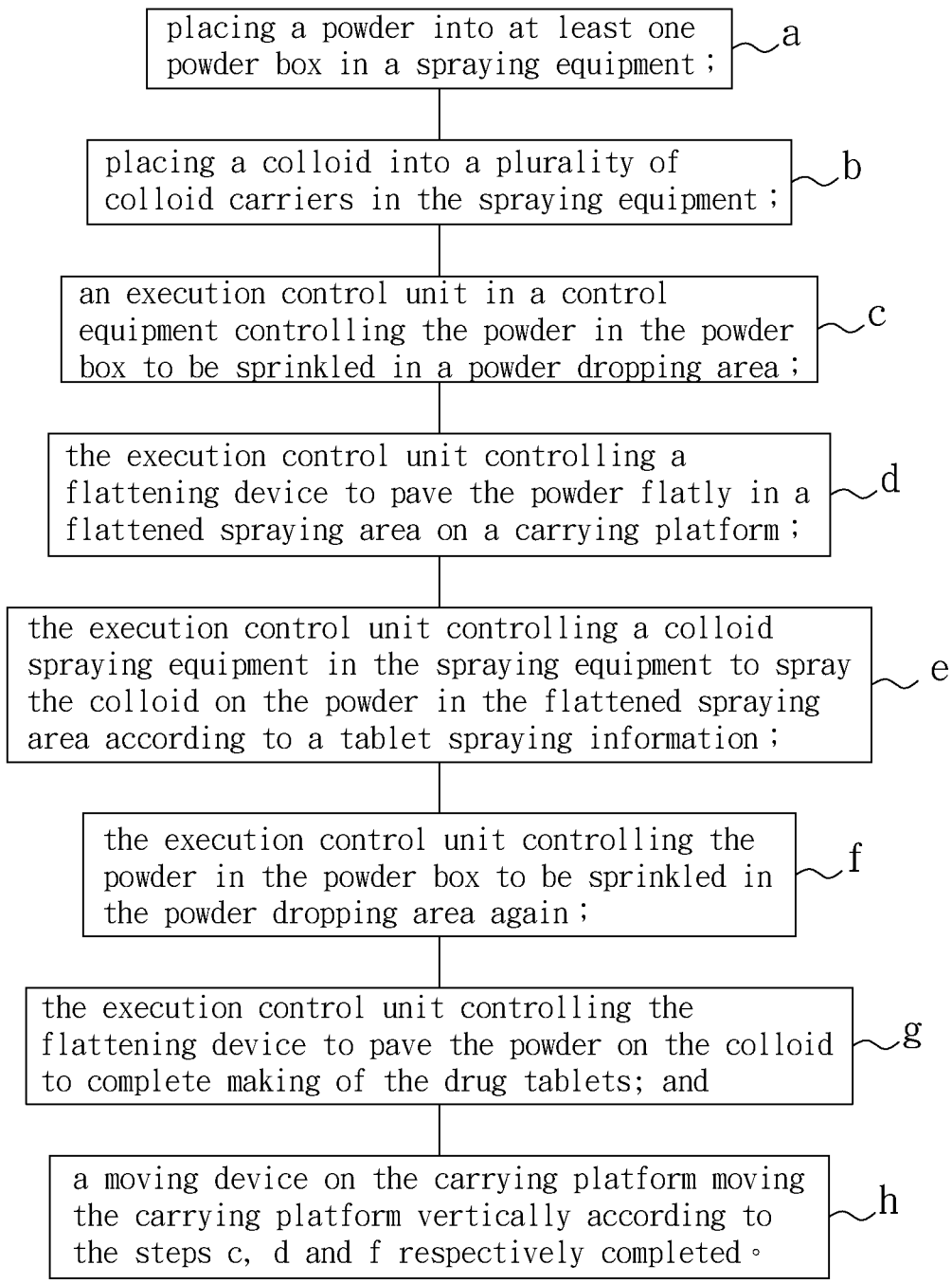
FIG. 7 is a flow chart of a manufacturing process of drug tablets of the invention.

Please refer to FIG. 1, FIG. 5 and FIG. 7 for a perspective view of a preferred embodiment of the invention; a perspective view of a colloid spraying equipment of the invention; and a flow chart of a manufacturing process of drug tablets of the invention respectively. The invention provides a permeable spraying device for making drug tablets mainly comprising a carrying platform 1, a spraying equipment 2, a flattening device 3, a control equipment 4, and a clamping equipment 5, wherein the carrying platform 1 defines a powder dropping area 10 and a flattened spraying area 11 adjacent to the powder dropping area 10, and a moving device 12 combined with the carrying platform 1 is capable of moving vertically. The spraying equipment 2 is mounted above the carrying platform 1, and the spraying equipment 2 comprises at least one powder box 20, a plurality of colloid spraying equipment 21, a driving device 22 and a placement platform 23, wherein the powder box 20 is used for storing a powder 200 (with medicinal compositions) (refer to FIG. 2), the driving device 22 is connected with each of the colloid spraying equipment 21 for horizontal movement, wherein the powder box 20 is correspondingly disposed above the powder dropping area 10, each of the colloid spraying equipment 21 is correspondingly disposed above the flattened spraying area 11 and comprises a plurality of colloid carriers 24 for accommodating a medicinal colloid 240 (refer to FIG. 4), and the placement platform 23 is provided with a plurality of supplementary colloid carriers 25, each of the supplementary colloid carriers 25 is provided with a pressure controller 26 connected to the colloid carrier 24 to automatically replenish the colloid 240. The flattening device 3 is installed on the carrying platform 1 and capable of moving horizontally back and forth in the flattened spraying area 11. The control equipment 4 is equipped with a storage unit 40 for storing a tablet spraying information (including: powder compositions, powder layer quantity, colloid compositions, colloid layer quantity, and colloid structure) and an execution control unit 41 connected to the storage unit 40 and controlling the powder box 20, the flattening device 3 and the colloid spraying equipment 21 to execute the tablet spraying information, in addition, the clamping equipment 5 (a hoist or a mechanical arm) is placed on one side of the flattening device 3 and facing the flattened spraying area 11.

The powder box 20 further comprises a stirring member 201 installed in the powder box 20 and a driving member 202 connected to the stirring member 201.

The colloid spraying equipment 21 further comprises a plurality of sprinklers 210 respectively connected to each of the colloid carriers 24 for spraying the colloid 240, each of the sprinklers 210 further comprises a plurality of colloid inlets 2100 and a plurality of nozzles 2102, the colloid inlets 2100 are connected to the respective colloid carriers 24, and each the nozzles 2102 communicates with the colloid inlet 2100 and ejects the colloid 240.

In addition, a nozzle cleaning equipment 6 for cleaning the nozzles 2102 is disposed on one side of the carrying platform 1. The nozzle cleaning equipment 6 comprises a soaking area 60, a strong jetting area 62 and a scraper equipment 64. When the sprinklers 210 need to be cleaned, since a sponge is placed in the soaking area 60, the sponge is capable of absorbing liquid for immersing the nozzles 2102 to soften the colloid 240 on the nozzles 2102, and then entering the strong jetting area 62 to spray off the colloid 240 attached with powder or dust on the nozzles 2102 through high pressure. Finally, the scraper equipment 64 is used to scrape off the colloid 240 on surfaces of the nozzles 2102 to ensure that there is no residual liquid or dust on the surfaces of the nozzles 2102. Since the strong jetting area 62 is defined with an inclined plane, and the inclined plane is inclined from the scraper equipment 64 towards the soaking area 60, so the colloid 240 that is scraped off will be gathered on the inclined plane of the strong jetting area 62. It is worth mentioning that since the scraper equipment 64 is made of soft rubber, it is capable of ensuring that the scraper equipment 64 will not be damaged due to friction after contacting with the nozzles 2102.

The nozzle cleaning equipment 6 can be cleaned once before each time of colloid spraying. After the nozzles 2102 are used over a long period, the nozzles 2102 may be attached with colloid residue that cannot be cleaned thoroughly by the above cleaning method, and therefore, in addition to the above cleaning method, residue on the nozzles 2102 that is difficult to clean can be coped with through ultrasonic vibration by an ultrasonic equipment 8 disposed on one side of the carrying platform 1.

According to the permeable spraying device for making drug tablets, a multi-layer drug body structure can be made with the following manufacturing process with steps including:
  a) placing a powder into at least one powder box in a spraying equipment;
  b) placing a colloid into a plurality of colloid carriers in the spraying equipment;
  c) an execution control unit in a control equipment controlling the powder in the powder box to be sprinkled in a powder dropping area;
  d) the execution control unit controlling a flattening device to pave the powder flatly in a flattened spraying area on a carrying platform;
  e) the execution control unit controlling a colloid spraying equipment in the spraying equipment to spray the colloid on the powder in the flattened spraying area according to a tablet spraying information;
  f) the execution control unit controlling the powder in the powder box to be sprinkled in the powder dropping area again;
  g) the execution control unit controlling the flattening device to pave the powder on the colloid to complete making of the drug tablets; and
  h) a moving device on the carrying platform moving the carrying platform vertically according to the steps c, d and f respectively completed.

The tablet spray information stored in the storage unit 40 in the manufacturing process comprises powder compositions, powder layer quantity, colloid compositions, colloid layer quantity, and colloid structure.

Figure 2:
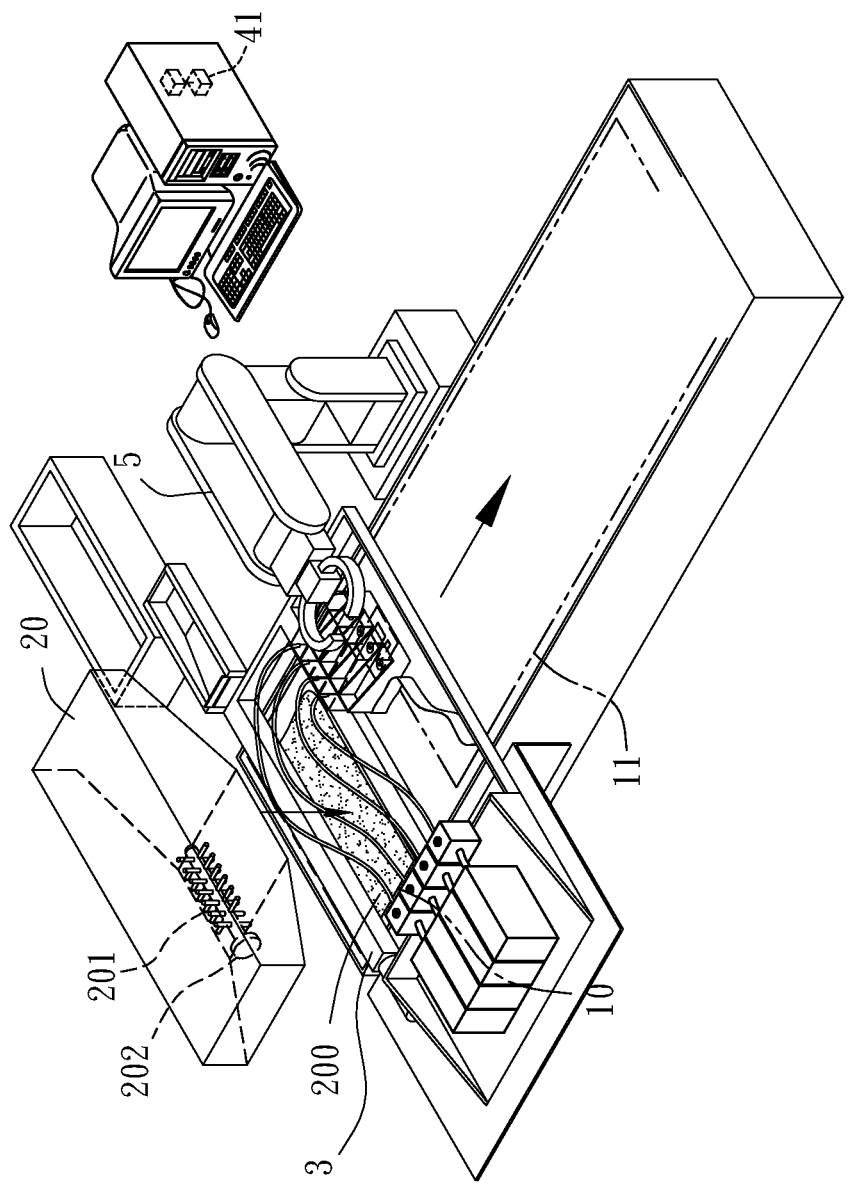
FIG. 2 is a schematic diagram of a usage state of powder dropping and powder spreading by a powder box of the invention.

Please refer to FIG. 2, FIG. 3, FIG. 4 and FIG. 5 for a schematic diagram of a usage state of powder dropping and powder spreading by a powder box of the invention; a schematic diagram of a usage state of a colloid spraying equipment of the invention for spraying colloid; a schematic diagram of a usage state of the powder box of the invention when powder is dropped and spread again; and a perspective view of the colloid spraying equipment of the invention respectively. FIG. 2 shows that according to the steps c and d, the powder 200 in the powder box 20 can be optionally added with medicinal or non-medicinal compositions according to properties or requirements of a drug, the execution control unit 41 in the control equipment 4 controls the powder 200 in the powder box 20 to be sprinkled in the powder dropping area 10 according to the tablet spraying information (including: powder compositions, powder layer quantity, colloid compositions, colloid layer quantity, and colloid structure), the powder box 20 is installed with the stirring member 201 and the driving member 202 connected to the stirring member 201, the driving member 202 drives the stirring member 201 to rotate so as to maintain the powder 200 in an agitated state, so that the fallen powder 200 can be evenly spread in the powder dropping area 10.

Then, the execution control unit 41 controls the flattening device 3 to pave the powder 200 flatly in the flattened spraying area 11.

Figure 3:
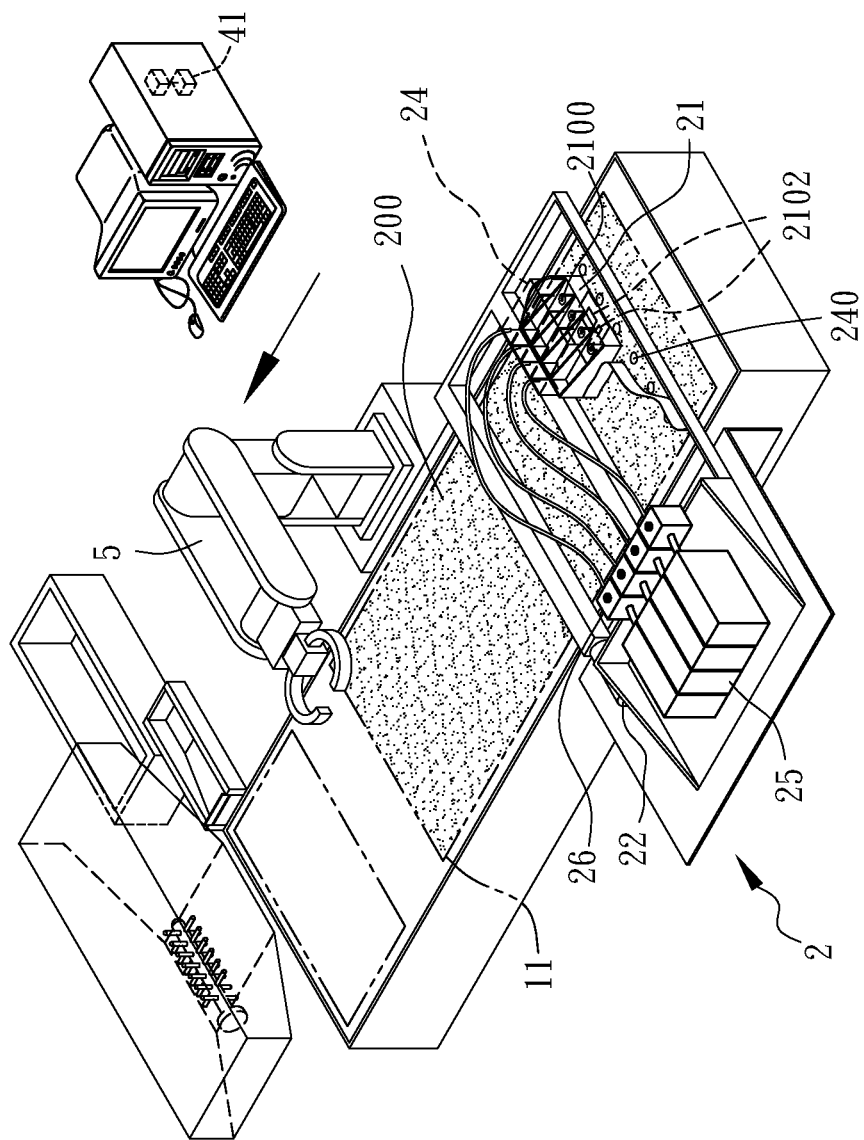
FIG. 3 is a schematic diagram of a usage state of a colloid spraying equipment of the invention for spraying colloid.

As shown in FIGS. 3 and 4, according to the steps e, f, g, after paving the powder 200 in the flattened spraying area 11 flatly, the execution control unit 41 controls the colloid spraying equipment 21 in the spraying equipment 2 to spray the colloid 240 on the powder 200 in the flattened spraying area 11 according to the tablet spraying information (including: powder compositions, powder layer quantity, colloid compositions, colloid layer quantity, and colloid structure). It is worth mentioning that the colloid 240 in the colloid carrier 24 will continuously reduce its volume during a spraying process, at this time, a pressure inside the colloid carrier 24 will be detected by the pressure controller 26. When the pressure controller 26 detects that the colloid 240 in the colloid carrier 24 is insufficient, the colloid 240 is automatically transferred from the supplementary colloid carrier 25 to the colloid carrier 24. In this way, a volume of the colloid 240 in the colloid carrier 24 can be prevented from being too little for spraying.

In addition, each of the colloid carriers 24 represents one type of the medicinal colloid 240. Therefore, when a drug tablet has four medicinal compositions, four of the colloid carriers 24 are required, each of the colloid carriers 24 is loaded on the sprinkler 210, and the colloid 240 is input through the respective colloid inlet 2100 and then output from the nozzles 2102. The colloid 240 can be sprayed in the following two ways. Taking the above four medicinal properties as an example, in a first spraying method, each of the colloid carriers 24 sprays separately, and the sprayed colloid 240 is combined with the flatly paved powder 200. In a second spraying method, the colloid 240 in each of the colloid carriers 24 is mixed and sprayed on the powder 200 again. The above two methods can be adjusted according to requirements.

After the colloid 240 is sprayed, the execution control unit 41 controls the powder 200 in the powder box 20 to be sprinkled in the powder dropping area 10 again. The driving member 202 in the powder box 20 is used to drive the stirring member 201 to rotate before sprinkling, thereby the powder 200 is kept in an agitated state, so that the fallen powder 200 can be evenly spread in the powder dropping area 10, and then the execution control unit 41 controls the flattening device 3 to pave the powder 200 flatly in the flattened spraying area 11. The execution control unit 41 controls the flattening device 3 to pave and combine the powder 200 on the colloid 240 to complete making of drug tablets. After making of the drug tablets is completed, the powder 200 without spraying the colloid 240 is recycled and reused. After the drug tablets are made, the clamping equipment 5 (using a mechanical arm as an example) disposed on one side of the flattening device 3 can be used to clamp and move each of the drug tablets.

Figure 6:
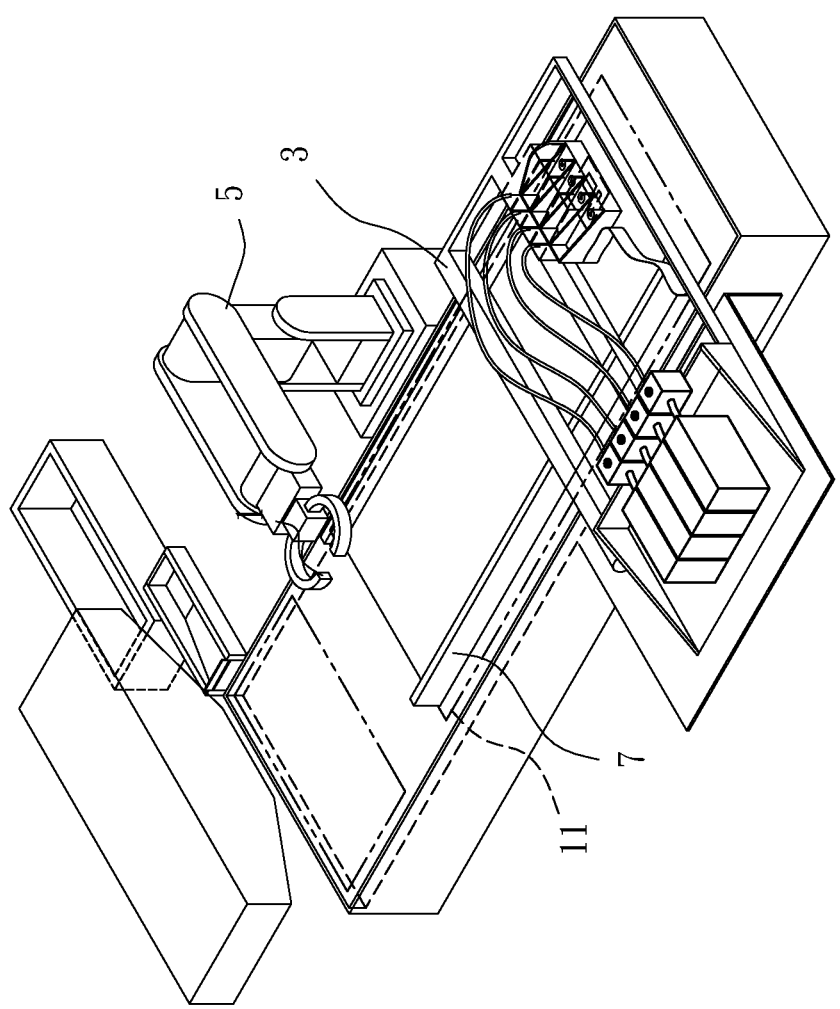
FIG. 6 is a structural perspective view of a carrier of the invention being placed.

Please refer to FIG. 6 also, which is a structural perspective view of a carrier of the invention being placed. In addition to the drug tablets being made on the flattening device 3, a carrier 7 (which can be a tray) can also be placed on the flattened spraying area 11, and making of drug tablets is carried out on the carrier 7. After all the drug tablets are made, it is only required for the clamping equipment 5 to directly clamp the carrier 7 to complete movement of all the drug tablets in one time, and then the other carrier 7 can be placed to perform making of the next batch of drug tablets.

It can be known from the above that the permeable spraying method of the invention is capable of spraying at designated positions according to compositions of drug tablets, and a multi-layer drug body structure can be formed by deposition, stacking and bonding, which is not only faster in manufacturing, but also lower in cost.

Figure 8:
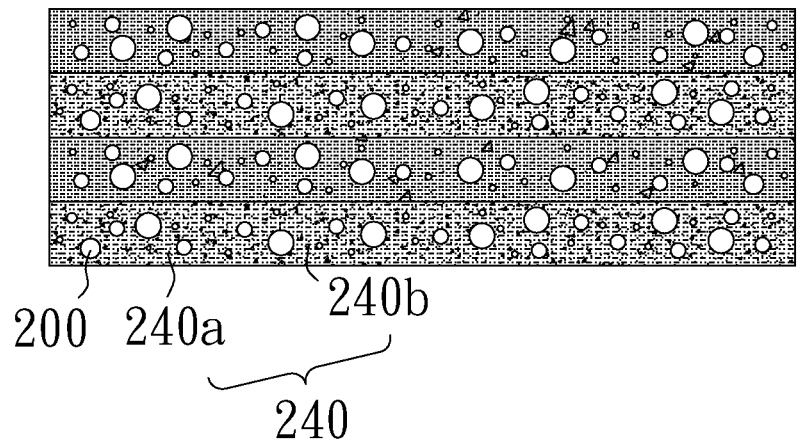
FIG. 8 is a cross-sectional view of a structure of a drug tablet with release rate of the invention.
Figure 9:
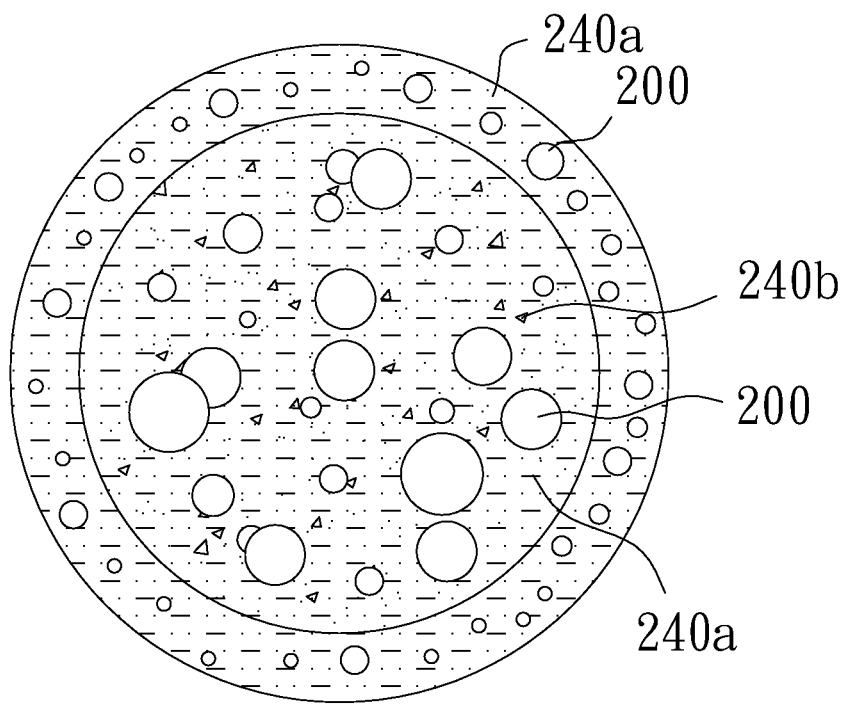
FIG. 9 is a top view of a structure of a drug tablet with release rate of the invention.

Please refer to FIGS. 8 and 9 for a cross-sectional view of a structure of a drug tablet with release rate of the invention; and a top view of a structure of a drug tablet with release rate of the invention respectively. It is further explained that besides the foregoing drug tablet with four medicinal properties and the spraying operation performed by the four colloid carriers 24 and the sprinkler 210 on each of the colloid carriers 24, it is especially important that each layer of the colloid 240 is sprayed to form a multi-layer drug body structure by deposition, stacking and bonding. The so-called deposition, stacking and bonding method, in short refers to the colloid 240 having a permeable drug colloid 240b, after completion, it represents the completion of a first layer, and then continue to stack in this way, while the permeable drug colloid 240b is added according to actual requirements. In addition, when a thickness of a whole drug tablet is 2 mm, and when a drug release rate of the drug tablet is to be delayed, the permeable drug colloid 240b can be sprayed on an intermediate layer and combined with the powder 200 and a drugless colloid 240a. As for FIG. 9, the permeable drug colloid 240b is combined with the powder 200 and the drugless colloid 240a and sprayed at a central position of the drug tablet, and then the powder 200 is spread flatly around and combined by the drugless colloid 240a to form another type of drug tablet capable of controlling drug release. It can be known from the above that dissolution time of different medicinal properties can be more effectively controlled, thereby suitable hierarchical positions can be configured according to the priority of different medicinal properties to achieve optimum release timings for different medicinal properties, so that users can gradually absorb according to sequences of different medicinal properties to achieve an optimum therapeutic effect.

Since a speed of drug release is closely related to the control of diseases, it takes a longer time to complete medicinal properties release for long-acting drugs for diseases such as hypertension, and for short-acting drugs for diseases such as heart disease, medicinal properties need to be released in a short time. In view of this, drug tablets prepared by the invention have excellent advantages for the controllable drug release rate.

Based on the above, the following advantages of efficacies of controlling a drug release rate can be summarized as follows: 1. a shape of a drug can be controlled to change the drug release rate, it should be further explained that a drug tablet with a porous structure is easier to dissolve than a drug tablet with a non-porous structure; 2. a position of a drug in a drug tablet can be controlled to determine a release rate (faster release of an outer layer, slower release of an inner layer); and 3. production of drug tablets with compound or multiple prescriptions and with adjustable drug release rate can be achieved by a single device.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. A permeable spraying device for making drug tablets comprising:

a carrying platform defining a powder dropping area and a flattened spraying area adjacent to the powder dropping area, the carrying platform combining with a moving device capable of moving vertically;

a spraying equipment mounted above the carrying platform, the spraying equipment comprising at least one powder box for storing a powder, at least one colloid spraying equipment, a driving device connected to the colloid spraying equipment and for horizontal movement and a placement platform, wherein the powder box is correspondingly disposed above the powder dropping area, the colloid spraying equipment is correspondingly disposed above the flattened spraying area and comprises a plurality of colloid carriers for accommodating a medicinal colloid and a plurality of sprinklers respectively connected with each of the colloid carriers for spraying the colloid, wherein each of the sprinklers further comprises a plurality of colloid inlets connected with each of the colloid carriers and a plurality of nozzles communicated with the colloid inlets and spraying the colloid, and the placement platform is provided with a plurality of supplementary colloid carriers, each of the supplementary colloid carriers is provided with a pressure controller connected to the colloid carrier to automatically replenish the colloid;

a flattening device installed on the carrying platform and capable of moving horizontally back and forth in the flattened spraying area;

a control equipment equipped with a storage unit for storing a tablet spraying information and an execution control unit connected to the storage unit and controlling the powder box, the flattening device and the colloid spraying equipment to execute the tablet spraying information;

a clamping equipment disposed on one side of the carrying platform and facing the flattened spraying area, and a nozzle cleaning equipment disposed on one side of the carrying platform and capable of cleaning each of the nozzles, wherein the nozzle cleaning equipment comprises a soaking area for liquid immersion of the nozzles, a jetting area located on one side of the soaking area and capable of jetting gas to the nozzles, and a scraper equipment located on one side of the jetting area and capable of completely scraping liquid on the nozzles.

2. The permeable spraying device for making drug tablets as claimed in claim 1, wherein the powder box further comprises a stirring member installed therein and a driving member connected to the stirring member.

3. The permeable spraying device for making drug tablets as claimed in claim 1, wherein the powder has medicinal compositions.

4. The permeable spraying device for making drug tablets as claimed in claim 1, wherein the tablet spraying information comprises powder compositions, powder layer quantity, colloid compositions, colloid layer quantity, and colloid structure.

5. The permeable spraying device for making drug tablets as claimed in claim 1, further comprising a carrier for making drug tablets and for the clamping equipment to clamp and move, and the carrier being placed on the flattened spraying area.

6. The permeable spraying device for making drug tablets as claimed in claim 5, wherein the carrier is a tray.

7. The permeable spraying device for making drug tablets as claimed in claim 1, wherein the clamping equipment can be either a hoist or a mechanical arm.

8. The permeable spraying device for making drug tablets as claimed in claim 1, wherein the scraper equipment is made of rubber.

9. The permeable spraying device for making drug tablets as claimed in claim 1, wherein the jetting area defines an inclined plane inclined from the scraper equipment towards the soaking area.

10. The permeable spraying device for making drug tablets as claimed in claim 1, further comprising an ultrasonic equipment disposed on one side of the carrying platform.

* * * * *